United States Patent
Knappenberger

(10) Patent No.: US 6,297,571 B1
(45) Date of Patent: Oct. 2, 2001

(54) ELECTRICAL MACHINE WITH A STATOR, AND A CLAW POLE ROTOR SYSTEM COMPOSED OF TWO POLE WHEEL HALVES

(75) Inventor: Uwe Knappenberger, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/233,578

(22) Filed: Jan. 19, 1999

(30) Foreign Application Priority Data

Jan. 22, 1998 (DE) .............................................. 198 02 303

(51) Int. Cl.⁷ .............................. H02K 9/00; H02K 11/00
(52) U.S. Cl. ...................... 310/60 R; 310/67 R; 310/51; 310/58; 310/61; 310/62; 310/63; 310/65; 310/89; 310/263
(58) Field of Search ................................ 310/51, 62, 63, 310/239, 263, 58, 61, 65, 89

(56) References Cited

U.S. PATENT DOCUMENTS

| | | | |
|---|---|---|---|
| 4,286,187 | * 8/1981 | Binder ..................................... | 310/91 |
| 4,959,576 | * 9/1990 | Horibe et al. ......................... | 310/239 |
| 5,237,230 | * 8/1993 | Sugiyama et al. ................... | 310/113 |
| 5,270,605 | * 12/1993 | Lefraincois et al. ................. | 310/263 |
| 5,751,088 | * 5/1998 | Mukai et al. ......................... | 310/239 |
| 5,763,968 | * 6/1998 | Hayashi et al. ....................... | 310/51 |
| 5,777,407 | * 7/1998 | Ishida et al. ............................ | 310/64 |
| 6,011,332 | * 1/2000 | Umeda et al. ......................... | 310/58 |

FOREIGN PATENT DOCUMENTS 43 42 870 C1  10/1995  (DE) .................................... 310/263

\* cited by examiner

*Primary Examiner*—Elvin Enad
(74) *Attorney, Agent, or Firm*—Michael J. Striker

(57) ABSTRACT

An electrical machine formed as a fluid-cooled three-phase alternating current generator has a cup-shaped housing, a stator arranged in the housing, a drive system, a shaft driven by the drive system, a claw pole rotor system mounted on the shaft, the claw pole rotor system including a first pole ring which is mounted on the shaft, formed as a pole wheel half and runs in claws, and a second pole ring which is formed as a pole wheel half and runs also in claws, so that tips of the claws of one of the pole rings extend in gaps between the claws of the other pole ring, pole rings producing a cooling air stream in the housing for withdrawing heat which is generated in the machine by convection through an outer casing of the housing to fluid medium which surrounds the housing, a plurality of substantially radially extending blower vanes formed on substantially flat end side of a respective one of the pole rings which is located at a side opposite to the drive system, and a ring chamber closing the blower vanes in an axial direction and formed as a part of a housing bottom.

8 Claims, 2 Drawing Sheets

ELECTRICAL MACHINE WITH A STATOR, AND A CLAW POLE ROTOR SYSTEM COMPOSED OF TWO POLE WHEEL HALVES

BACKGROUND OF THE INVENTION

The present invention relates to an electrical machine, in particular a fluid-cooled three-phase alternating current generator.

Such electrical machines are known in the art. One of such machines are disclosed for example in the German patent document DE-PS 43 42 870. The cooling of the claw pole system in this electrical machine is performed by heat conduction of the ball bearing, by radiation to the stator and the housing, by convection on the belt pulley, as well as by convection of the closed housing. In such machines temperature and cooling problems occur at very high rotary speeds, for example greater than 15,000 per minute, since the iron loses in the rotor system as well as the ball bearing losses increase with the rotary speed. A sufficient cooling is therefore no longer guaranteed in machines of the above mentioned type.

SUMMARY OF THE INVENTION

Accordingly, it is an object of the present invention to provide an electrical machine of the above mentioned type, which avoids the disadvantages of the prior art.

In keeping with these objects and with others which will become apparent hereinafter, one feature of present invention resides, briefly stated, in an electrical machine in which the blower means are formed substantially as radially extending blower vanes provided on a substantially flat end side of a pole ring which is located at a side opposite to the drive system, and a ring space closes in the axial direction the blower vanes as a part of the housing bottom.

When the electrical machine is designed in accordance with the present invention, it has the advantage that the cooling is substantially improved due to forced convection and meaningful airflow inside the machine.

The inventive blower efficiently solves this problem with the airflow rate which increases with the increasing rotary speed, and especially at the high rotary speeds.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
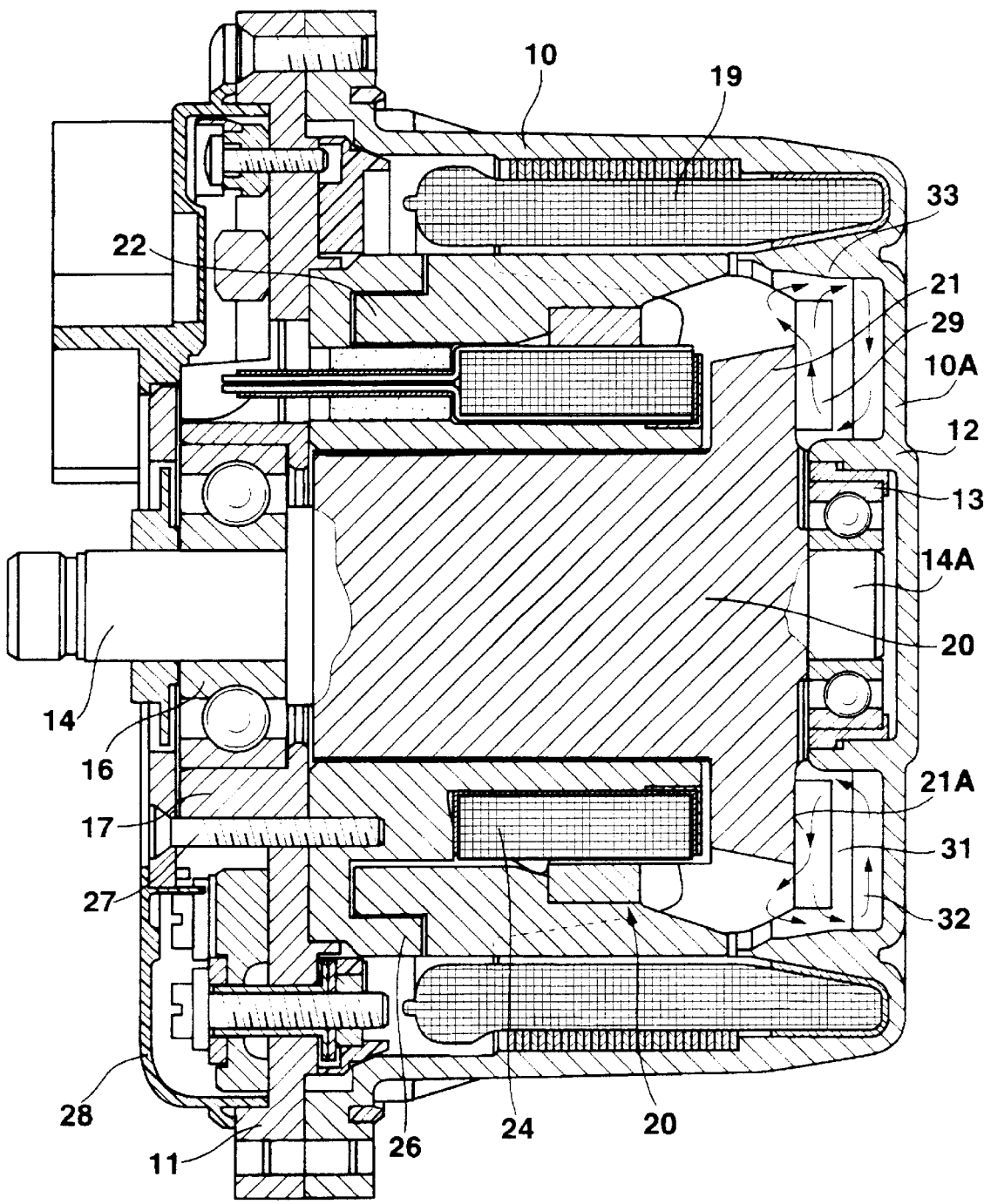
FIG. 1 is a view showing a longitudinal section of a fluid-operated cooled three-phase alternating current generator in accordance with the present invention.

A generator in accordance with the present invention shown in FIG. 1 has a substantially cup-shaped housing 10 which is a closed by a cover 11. A hub 12 is formed on a bottom 10a and receives a ball bearing 17. A shaft 14 has an end 14a which is supported in the ball bearing 13. The shaft 14 also has another opposite end which extends outwardly of the housing. A ball bearing 16 is supported on the opposite end of the shaft 14. The ball bearing 16 is also supported in a hub 17 of the cover 11. This is a drive side of the generator.

A stator 19 is arranged substantially in the center of the housing 10 on its wall. A claw pole rotor system 20 is located between the stator and the shaft and formed as a windingless rotor. The claw pole rotor system 20 includes pole rings 21 and 22 which have claws engaging alternatingly in one another. A stationary excitation winding 24 is arranged between the claws and the shaft 14. It is located on a housing flange 26 which abuts against the housing cover 11 and is substantially tubular. The housing flange 26 is fixed by screws 27 and abuts against the cover 11.

Control and regulation components for the generator are located between the cover 11 and a hood 28 which closes the housing. They are not disclosed here in detail since they are not germaine to the invention and are conventional for generators of this type.

Several blower vanes 29 are located on a flat end side 21a of the pole ring 21. They extend substantially radially to the vicinity of the hub 12. A relatively wide ring chamber 31 is located between the end side 21a of the pole ring 21 and the bottom 10a of the bottom 10. A plurality of substantially radially extending ribs 32 are formed on it and extend close to the blower vanes 29, with a gap there between. The ribs can be straight or curved, which is also true for the blower vanes 29.

With a special design of the ring chamber 31 and the connecting zone 33 which extends substantially parallel to the shaft 14 and close to the stator 19 for embedding of the winding head, a relatively great inwardly located cooling surface is provided.

The housing is rinsed with cooling water. Due to the relatively great cooling surface and due to the air circulation from the blower vanes 29 identified by the arrow, the heat produced in the generator is withdrawn very efficiently to the cooling fluid. As a result, the not flow-active water is minimized. The non-flow active water is a flow which has only a very little movement.

Preferably, the blower vanes are composed of high heat-conductive material, and connected heat-conductively with the pole ring 21. The connection is performed for example by forging, welding or clamping.

The optimal number of the blower vanes 29 and the ribs 32 or the grooves depends on the size of the generator. The air exchange of the air volumes between the pole rings 21, 22 is performed through guiding edges in the housing and radially through the blower.

An especial advantage of the generator in accordance with the present invention resides in the special utilization of the great, inwardly located cooling surface of the housing, and the special type and arrangement of the blower vanes which provide a high turbulence and a high heat transition coefficients, as well as the increase of the cooling surfaces in particular of the ring chamber 31 and the zone 33. Due to the forced air circulation, especially in the event of high rotary speeds, a heat transportation through air between the claw pole rotor system and the above described cooling surface is provided. The outer surfaces in the air gap of the claw pole rotor system 20 or stator and excitation winding serve for heat transmission to the air.

Figure 2:
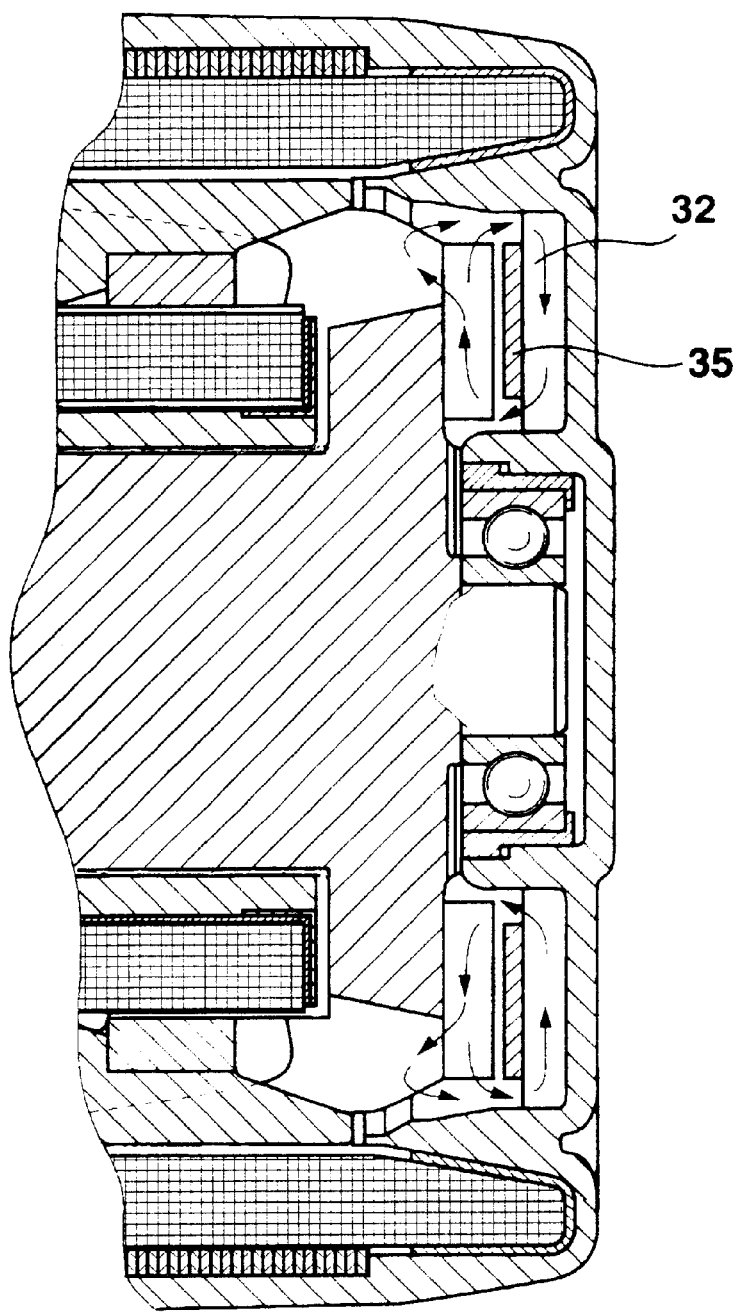
FIG. 2 is a partial view of a variant of the generator of FIG. 1, in accordance with the present invention.

FIG. 2 shows another embodiment of the present invention. Here an efficient aeration is provided. For this purpose a metallic ring disc 35 is arranged on the ribs 32 and composed for example of aluminum. Its width substantially corresponds to the length of the blower vanes 29. In other words, gaps are provided at both sides of the ring disc to the grooves located between the ribs 32. The ring disc 35 is thermally coupled with the bottom 10a and thereby the cooling surface is additionally increased.

It will be understood that each of the elements described above, or two or more together, may also find a useful application in other types of constructions differing from the types described above.

While the invention has been illustrated and described as embodied in electrical machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by letters patent is set forth in the appended claims:

What is claimed is:

1. An electrical machine formed as a fluid-cooled three-phase alternating current generator, comprising a cup-shaped housing; a stator arranged in said housing; a drive system; a shaft driven by said drive system; a claw pole rotor system mounted on said shaft, said claw pole rotor system including a first pole ring which is mounted on said shaft, formed as a pole wheel half and has claws, and a second pole ring which is formed as a pole wheel half and also has claws, so that tips of the claws of one of said pole rings extend in gaps between the claws of the other pole ring; pole rings producing a cooling air stream in said housing for withdrawing heat which is generated in the machine by convection through an outer casing of said housing to fluid medium which surrounds said housing; blower means including a plurality of substantially radially extending blower vanes formed on substantially flat end side of a respective one of said pole rings which is located at a side opposite to said drive system; and a ring chamber closing said blower vanes in an axial direction and formed as a part of a housing bottom, said ring chamber having a bottom provided with substantially radially extending ribs which form grooves therebetween, said grooves being located at a height of said blower vanes, said ribs from said bottom of said ring chamber being straight.

2. An electrical machine as defined in claim 1, wherein said housing bottom has a hub; and further comprising a shaft bearing received in said hub, said blower vanes extending close to said hub.

3. An electrical machine as defined in claim 1; and further comprising a metal ring disc which is arranged in a region of said ribs and partially covers said ribs.

4. An electrical machine as defined in claim 3, wherein said ring disc is thermally coupled with said ribs.

5. An electrical machine formed as a fluid-cooled three-phase alternating current generator, comprising a cup-shaped housing; a stator arranged in said housing; a drive system; a shaft driven by said drive system; a claw pole rotor system mounted on said shaft, said claw pole rotor system including a first pole ring which is mounted on said shaft, formed as a pole wheel half and has claws, and a second pole ring which is formed as a pole wheel half and also has claws, so that tips of the claws of one of said pole rings extend in gaps between the claws of the other pole ring; pole rings producing a cooling air stream in said housing for withdrawing heat which is generated in the machine by convection through an outer casing of said housing to fluid medium which surrounds said housing; blower means including a plurality of substantially radially extending blower vanes formed on substantially flat end side of a respective one of said pole rings which is located at a side opposite to said drive system; and a ring chamber closing said blower vanes in an axial direction and formed as a part of a housing bottom, said ring chamber having a bottom provided with substantially radially extending ribs which form grooves therebetween, said grooves being located at a height of said blower vanes, said ribs from said bottom of said ring chamber being arcuate.

6. An electrical machine as defined in claim 5, wherein said housing bottom has a hub; and further comprising a shaft bearing received in said hub, said blower vanes extending close to said hub.

7. An electrical machine as defined in claim 5; and further comprising a metal ring disc which has arranged in a region of said ribs and partially covers said ribs.

8. An electrical machine as defined in claim 7, wherein said ring disc is thermally coupled with said ribs.

* * * * *